Figure 1:
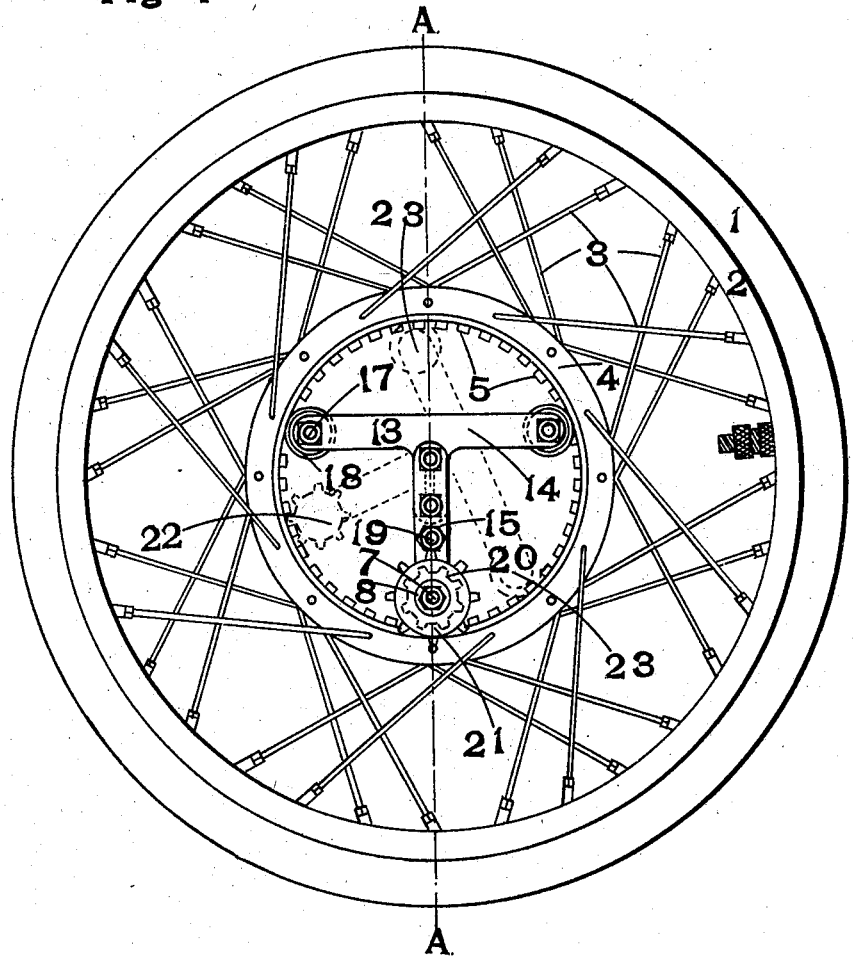

No. 806,452. PATENTED DEC. 5, 1905.
C. S. BAULD.
DRIVING WHEEL FOR MOTOR VEHICLES.
APPLICATION FILED MAY 3, 1905.

3 SHEETS—SHEET 1.

Witnesses

Inventor
Charles S. Bauld

No. 806,452. PATENTED DEC. 5, 1905.
C. S. BAULD.
DRIVING WHEEL FOR MOTOR VEHICLES.
APPLICATION FILED MAY 3, 1905.

3 SHEETS—SHEET 2.

No. 806,452. PATENTED DEC. 5, 1905.
C. S. BAULD.
DRIVING WHEEL FOR MOTOR VEHICLES.
APPLICATION FILED MAY 3, 1905.

3 SHEETS—SHEET 3.

Witnesses
Hm. Kuchve
John A. Percival

Inventor
Charles S. Bauld
By Richardn
ATTORNEYS

UNITED STATES PATENT OFFICE.

CHARLES SARSFIELD BAULD, OF LATROBE, TASMANIA, AUSTRALIA, ASSIGNOR OF ONE-HALF TO ALFRED CHRISTIAN DEHLE, OF HOBART, TASMANIA, AUSTRALIA.

DRIVING-WHEEL FOR MOTOR-VEHICLES.

No. 806,452.        Specification of Letters Patent.        Patented Dec. 5, 1905.

Application filed May 3, 1905. Serial No. 258,597.

*To all whom it may concern:*

Be it known that I, CHARLES SARSFIELD BAULD, a subject of the King of Great Britain and Ireland, residing at Latrobe, in the State of Tasmania, Commonwealth of Australia, have invented certain new and useful Improvements in the Driving-Wheels of Motor-Cycles, Automobiles, and other Self-Propelled Vehicles, of which the following is a specification.

The object of this invention is to prevent damage that may be caused to the tire of the driving-wheels of motor-cycles, automobiles, or other self-propelled vehicles, or other parts of the vehicles, when a sudden increase of speed is imparted by the engine and the loss of power that may be caused through the belt slipping; also, to lessen the strain on the engine, thus making it possible to secure better results from it.

Further objects of the invention are to minimize the jolt caused by the wheels passing over uneven ground and to facilitate the mounting of hills.

The invention is also designed to act as an intermediate gear, receiving the rapid movements of the engine and imparting to the driving-wheel a suitable speed.

In the drawings hereto annexed I have shown my invention applied to the driving-wheel of a motor-cycle; but, as will be obvious, it is equally applicable to automobiles or other self-propelled vehicles.

Figure 2:
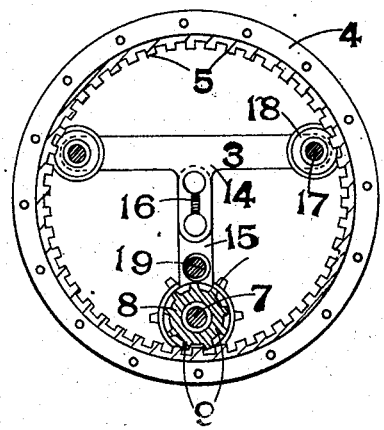
Figure 4:
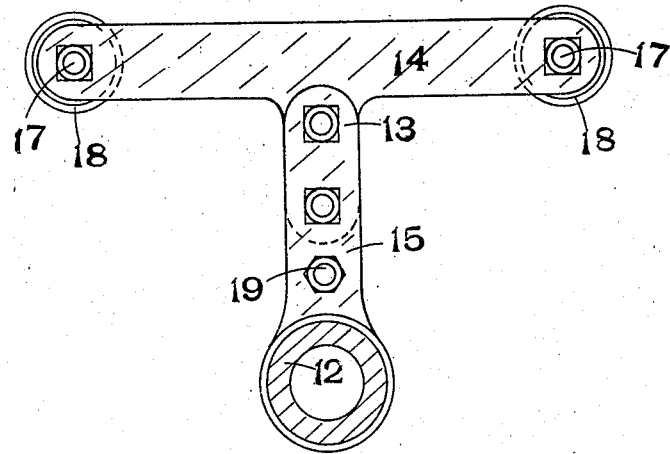
Figure 3:
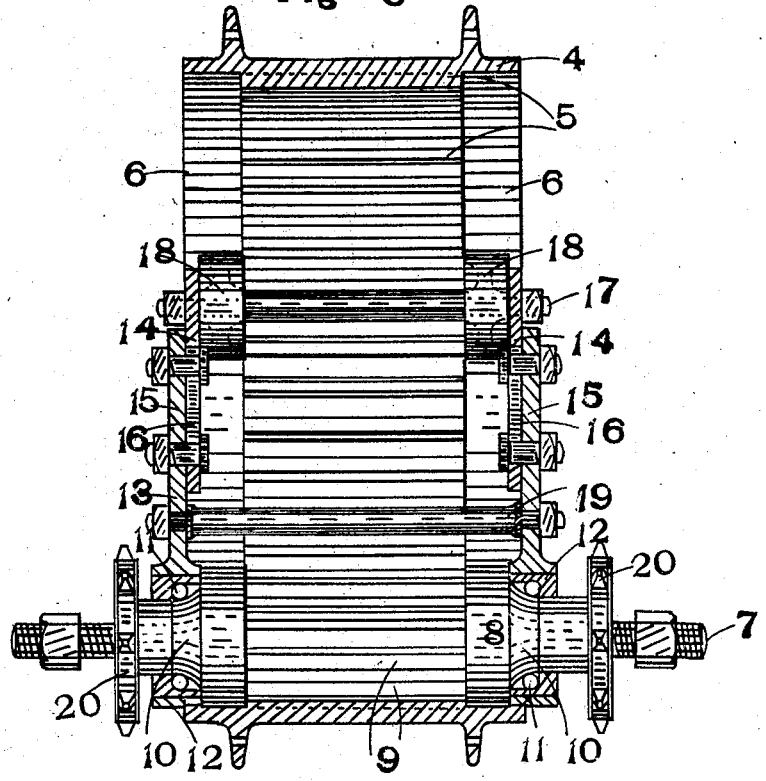

Referring now to the drawings, in which the same reference-numerals are used to designate the same parts wherever they occur, Figure 1 is a side elevation of the driving-wheel of a motor-cycle embodying my invention. Fig. 2 is a side elevation of the hub in section. Fig. 3 is a vertical section of the hub on the line *a a*, Fig. 1; and Fig. 4 is a side elevation of the framework of the hub. Figs. 3 and 4 are drawn on a larger scale than Figs. 1 and 2.

1 is the tire of the wheel; 2, the rim; 3, the spokes, and 4 the hub. Said hub is hollow and is fitted with cogs 5 on its inner or concave surface. On each side of the cogs 5 and at the outside ends of the hub 4 are smooth surfaces 6 6.

7 is a spindle.

8 is a pinion which runs on ball-bearings and cones fitted to the spindle 7 in the usual manner. The cogs 9 of the pinion 8 gear into and are of the same length as the cogs 5 on the hub 4. The pinion 8 at each end of the cogs 9 is of larger diameter than the cogs and stands above the level of the said cogs and bears against the smooth surfaces 6 6 on either side of the cogs 5 when the pinion 8 is engaged with said cogs. The proportion of the number of cogs on the pinion to those on the hub is about one to five or six.

The ends of the pinion 8 are turned down to form cones 10 10, which run on balls 11 in the cups 12 12, screwed into the lower portion 15 15 of the framework 13. Said framework is constructed of four pieces 14 14 15 15. The two upper portions 14 14 are made in the form of a T, and to that portion which constitutes the leg thereof and carries the slot 16 are fixed by means of bolts straight pieces of iron 15 15 of similar size to that used in the construction of 14 14. Said slots 16 16 are for the purpose of varying the adjustment of the framework 13 in the hub 4. Passing through the ends of the arms of the upper portion 14 14 of the framework are two spindles 17 17, each carrying two rollers 18 18. Said rollers run on the smooth surfaces 6 6 of the hub 4. The two sides of the framework 13 are securely fastened together by means of the stay 19.

Fitted rigidly to those portions of the pinion 8 that project outwardly through the cups 12 12 are sprocket-wheels 20 20, one of which is connected with the engine and the other with the pedals by the usual gear-chains.

The sprocket-wheel on the engine may be of the same gear as that on the driving-wheel.

The forks of the bicycle are attached to the spindle 7 in the usual manner.

The mode of operation is as follows: Motion is given to the driving-wheel by the action of the engine, causing the sprocket-wheels 20 20 (which are attached to the pinion 8, which gears into the cogs 5 on the inner surface of the hub 4) to revolve. The weight of the vehicle resting on the spindle 7 tends to keep the latter at 21, the lowest point of the hub 4, as shown in full lines in Fig. 1. The revolution of the pinion causes it to travel up the cogs 5 on the inside of the hub 4, so that it may possibly reach a point about 22 and the rollers on the arms a point about 23 23, both as shown in dotted lines in Fig. 1. The normal position of the spindle 7 when the engine is in motion, however, will be about half-way between the two points 21 and 22. It is obvious that the greater the speed of the pinion 8 the higher it will mount the cogs 5. When the spindle 7 moves forward, it will cause its load to rest on a part of the wheel that is forward of the center bearing-line— that is, an imaginary line drawn from the center of the wheel to a point where the wheel touches the ground. By this means the load helps to bear the front of the wheel downward, and thus assists to drive the vehicle forward. When mounting hills, the advantage of the forward position of the spindle will be specially felt, for instead of the load being behind the center bearing-line, as is the case in vehicles fitted with ordinary hubs when mounting hills, it will be in front of it and will thus render the ascent easier. When the vehicle jolts over uneven ground, the pinion will recede with the jolt, which will thus not be felt by the rider to its full extent. When the engine is being started, the spindle carrying the spindle 8 can advance upward along the cogs 5 of the hub from 21 as the wheel is gathering momentum, and in the event of a sudden increase of the speed of the engine while the vehicle is moving the spindle can advance farther along the wheel from its normal position. In both these cases the shock to the gear or other parts of the vehicle will be avoided or minimized to a great extent and no power will be lost, as motion will be imparted to the driving-wheel when the spindle is receding from its advanced position.

Having thus described my invention, what I claim as new, and desire to secure by Letters Patent of the United States, is—

The combination with a driving-wheel of a self-propelled vehicle, of a hollow hub 4 fitted with cogs 5 on its inner surface, said cogs having smooth surfaces 6, 6, on either side thereof, a T-shaped frame, rollers 18 at the ends of the horizontal arm of the T, a spindle 7 carried at the end of the other arm, a pinion 8 loosely mounted on said spindle, said pinion engaging with the cogs 5 and having smooth enlarged portions at each end engaging with the surfaces 6, 6, and toothed wheels 20 mounted on the extended ends of pinion 8 carried on the spindle.

In witness whereof I have hereunto set my hand in the presence of two witnesses.

CHARLES SARSFIELD BAULD.

Witnesses:
 LINDSAY TULLOCH,
 FREDK. RAUTE.